No. 693,867. Patented Feb. 25, 1902.
O. E. JOHNSTON.
HARROW DISK JOURNAL.
(Application filed Nov. 25, 1901.)

(No Model.)

Witnesses:
Arthur McArthur
H. C. Rodgers

Inventor:
Oman E. Johnston.
By Fischer Thorp attys

UNITED STATES PATENT OFFICE.

OMAN E. JOHNSTON, OF KANSAS CITY, MISSOURI.

HARROW-DISK JOURNAL.

SPECIFICATION forming part of Letters Patent No. 693,867, dated February 25, 1902.

Application filed November 26, 1901. Serial No. 83,727. (No model.)

*To all whom it may concern:*

Be it known that I, OMAN E. JOHNSTON, a citizen of the United States, residing at Kansas City, in the county of Jackson and State of Missouri, have invented certain new and useful Improvements in Harrow-Disk Journals, of which the following is a specification.

My invention relates to harrow-disk journals, and has for its object to produce a structure which excludes dust and sand from them and at the same time provides a reservoir which will contain sufficient oil to keep the bearing lubricated for a number of days.

To this end the invention consists in certain novel and peculiar features of construction and organization, as hereinafter described and claimed, and in order that it may be fully understood reference is to be had to the accompanying drawings, in which—

Figure 1:
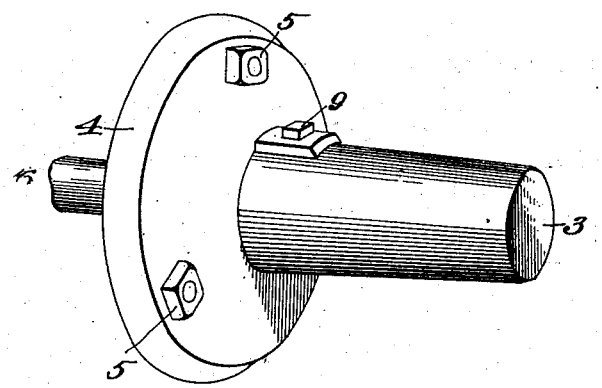
Figure 2:
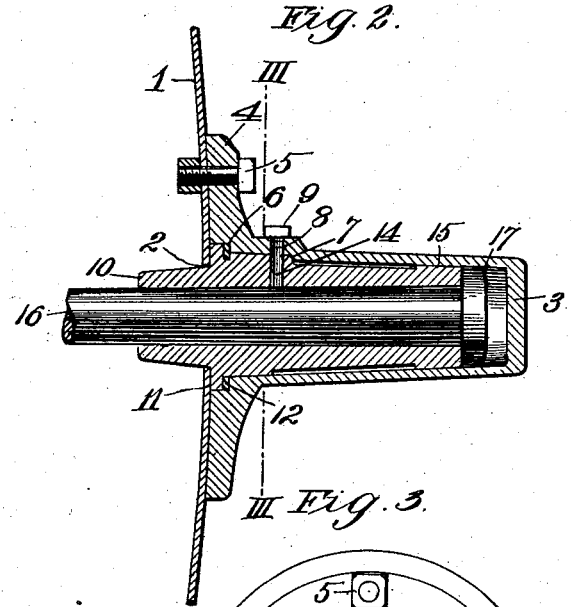
Figure 3:
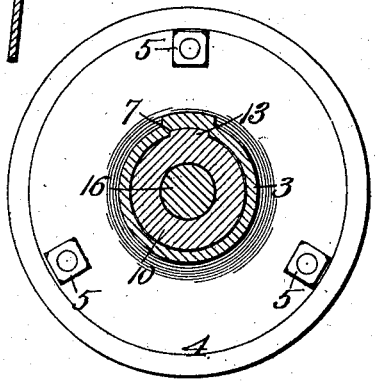

Figure 1 is a perspective view of a harrow-disk journal embodying the invention. Fig. 2 is a vertical longitudinal section of the same. Fig. 3 is a cross-section taken on the line III III of Fig. 2.

In carrying out my invention the disk 1 is provided with the usual central hole 2, in axial alinement with the elongated conical cap 3, which cap is provided at its base or open end with an annular outwardly-projecting flange 4, bolted, as at 5, to the disk. The cap is diametrically enlarged internally at its open end, so as to provide the annular shoulder 6, and is formed with an internal longitudinal groove 7, opening through said shoulder. The cap is also provided with a radial passage 8, registering with groove 7 and normally closed by a screw-bolt 9 for a purpose which hereinafter appears.

10 designates the bushing of the journal, the same being in the form of an elongated sleeve projecting at one end through opening 2 of the disk and having an external annular flange 11, fitting snugly in the enlargement of the cap, and tightly interposed between the disk and the cap-shoulder 6 is a washer 12. The bushing is interlocked with the cap by an external rib 13 engaging groove 7 and is formed with a radial passage 14, extending through said groove and registering with the cap-passage 8, hereinbefore referred to. The bushing is of such diameter as to leave an annular space between it and the cap and terminates short of the closed end of the latter, so as to leave a space between, which serves as an oil-reservoir, as hereinafter referred to. This reservoir communicates with the annular space surrounding the bushing, the latter at its end contiguous to the closed end of said cap being provided with enlargements 15, which without closing communication between said spaces bear against the cap, so as to make the connection between the outer end of the same and the corresponding end of the bushing rigid and stable. The stub-shaft 16, upon which the bushing is journaled, is provided with a head 17, fitting loosely in the reservoir, so as to impose strain placed upon the shaft principally against the end of the bushing, the latter in turn being held reliably in place by the disk bearing against flange 11, as hereinafter explained. The washer 12, of leather or equivalent material, prevents any escape of oil from the cap past the bushing-flange 11, so that the only point of escape for oil is between the bushing and stub-shaft after the lubricating function has been performed, though it will also be apparent that by reason of the fact that the disk operates at an angle, with the closed end of the cap disposed below its open end, there will be practically no waste at such point, it being also understood that the exposed end of the bushing is in practice provided with the usual cap (not shown) to exclude the dust or dirt at that point and also to retain the oil as long as possible. It is obvious that there is no possibility of dirt or sand obtaining access to the bearing at the side of the disk occupied by the cap, for the reason that the closed end of the latter is integrally formed with its body portion. The oil is introduced through the registering passages 7 and 8 by removing bolt 9 and prevented from escaping at such point by the replacement of such bolt.

From the above description it will be apparent that I have produced a harrow-disk journal which embodies the features of advantage enumerated as desirable and makes it practicable to increase its strength and durability and decrease its weight by making the outer shell or cap of soft or tenacious cast metal and the inner portion or bushing of hard cast metal, which latter when sufficiently worn can be easily and cheaply replaced. It is also obvious that the structure is susceptible of change in various minor particulars without departing from the principle and scope or sacrificing any of the advantages of the appended claims.

Having thus described the invention, what I claim as new, and desire to secure by Letters Patent, is—

1. A journal, comprising a cap closed at one end, a bushing fitting in and interlocked with said cap and projecting beyond its open end, and a shaft fitting in said bushing and provided with a head interposed between the bushing and the closed end of the cap.

2. A journal, comprising a cap, closed at one end, and provided at its open end with a shoulder, a bushing fitting in and interlocked with said cap and projecting beyond its open end, a washer clamped by said bushing against said shoulder, and a shaft fitting in said bushing and provided with a head interposed between the bushing and the closed end of the cap.

3. A journal, comprising a cap, closed at one end, and provided with a passage, a bushing fitting in and interlocked with said cap, and provided with a passage registering with the cap-passage, a removable bolt closing the cap-passage, and a shaft extending through the bushing and provided with a head interposed between the end of the latter and the closed end of the cap.

4. A journal, comprising a cap closed at one end and provided with a shoulder at its open end, and a passage, a removable plug closing said passage, a bushing fitting in and interlocked with said cap and provided with a flange opposite said shoulder, and with a passage registering with the cap-passage, a washer secured between the shoulder of the cap and the flange of the bushing, and a shaft fitting in said bushing and provided with a head interposed between the ends of the same and the closed end of the cap.

5. The combination of a cap closed at one end and open at the other, a disk secured to the cap at its open end and provided with a central opening in alinement with the hollow of the cap, a bushing fitting in and interlocked with the cap and held therein by the disk, and projecting through the latter, and a shaft journaled in the bushing and provided with a head interposed between the closed end of the cap and the contiguous end of the bushing, substantially as described.

In testimony whereof I affix my signature in the presence of two witnesses.

OMAN E. JOHNSTON.

Witnesses:
 H. C. RODGERS,
 G. Y. THORPE.